Figure 1:
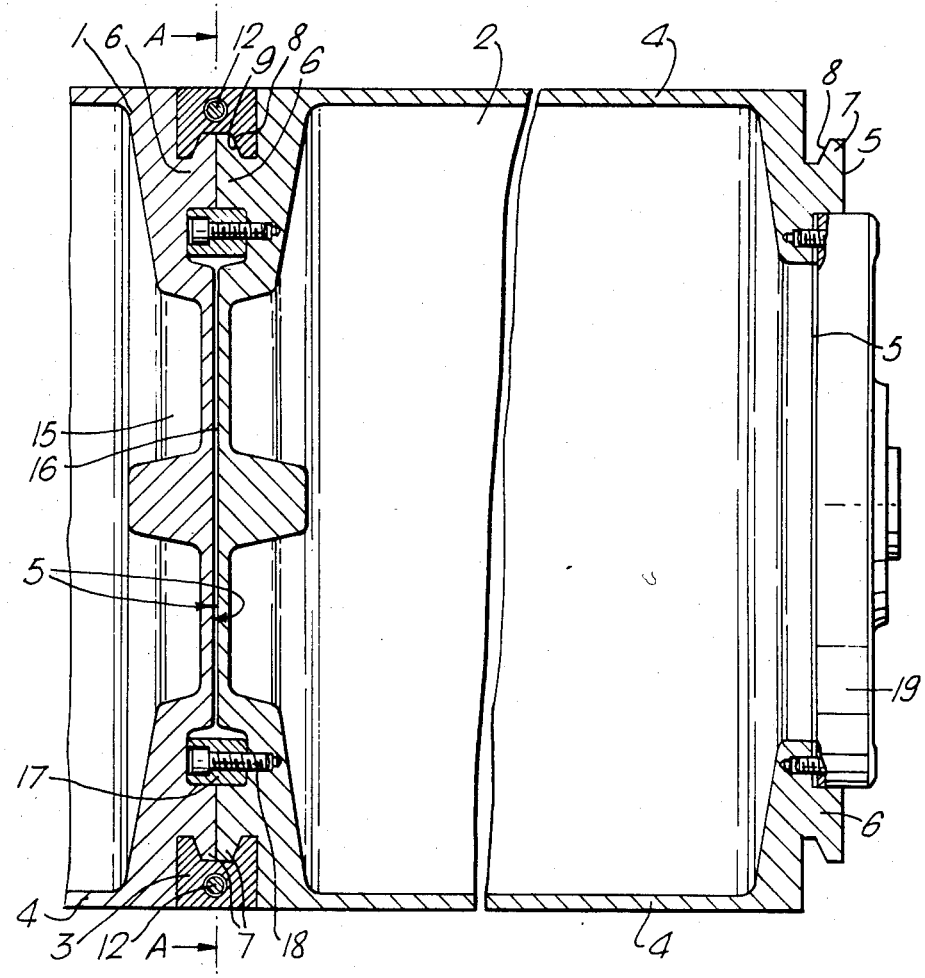

United States Patent [19]

Leigh

[11] Patent Number: 4,691,637

[45] Date of Patent: Sep. 8, 1987

[54] MODULAR GROUND MINE

[75] Inventor: John W. Leigh, Sale, England

[73] Assignee: The Secretary of State for Defence in Her Britannic Majesty's Government of the United Kingdom of Great Britain and Northern Ireland, London, England

[21] Appl. No.: 662,987

[22] Filed: Sep. 6, 1984

[30] Foreign Application Priority Data

Sep. 9, 1983 [GB] United Kingdom ............... 8324179

[51] Int. Cl.⁴ .............................................. F42B 22/06
[52] U.S. Cl. .................................... 102/406; 102/293; 403/338
[58] Field of Search ....................... 102/406, 401, 293; 285/322, 323, 406, 407, 408; 292/256.6, 256.63, 256.65, 256.67; 403/314, 338

[56] References Cited

U.S. PATENT DOCUMENTS

| 2,352,226 | 6/1944 | Ronning | 102/406 |
| 2,675,253 | 4/1954 | Stade | 285/408 |
| 2,978,265 | 4/1961 | Cluff et al. | 403/338 |
| 4,485,740 | 12/1984 | Boss | 102/293 |

Primary Examiner—Charles T. Jordan
Attorney, Agent, or Firm—Stevens, Davis, Miller & Mosher

[57] ABSTRACT

A naval ground mine comprising two modules (1, 2) each having a cylindrical casing (4) containing explosive material. The modules have mating end faces (5), each provided with a spigot (6). Lips (7) on adjacent spigots form an annular projection which tapers in a radially outward direction. The two modules (1, 2) are held together by a split ring (3) having a corresponding internally tapered surface (9), which embraces this annular projection. As the ring (3) is tightened, the adjacent end faces (4, 5) are drawn tightly together. The external surface of the ring provides a smooth transition between the external surfaces of the modules, so as to minimize surface discontinuity and the possibility of detection by sonar.

4 Claims, 2 Drawing Figures

MODULAR GROUND MINE

This invention relates to naval ground mines which can be built up from a number of similar basic units. In modern naval warfare, the normal practice is to maintain stocks of ground mines of each of a number of different sizes, containing for example from 100 to 600 kg of explosive. This is necessary in order to meet operational requirements for mining in varying depths of water, but of course leads to large stocks. Modern munitions are costly, and the naval ground mine is a large store. Any measure which could reduce the capital investment involved in storing adequate supplies of various sizes, and which could alleviate the storage and retrieval problems, would be extremely useful.

Known to the Applicant is one form of ground mine which meets these difficulties by the provision of a modular mine comprising a plurality of similar basic sections or modules, a selected number of which can be connected together to form a single unit having the desired explosive mass. Thus only modules of one kind need to be kept in store to meet the range of operational requirements.

Naval ground mines must be capable of withstanding extremely rough handling, and hence in particular, with a modular design, the method of connecting modules must make for a very strong, robust joint. In the case of the prior art mine just mentioned, a strong joint is achieved by the simple expedient of providing a flange at each end of each module, and bolting through the flanges. This method, however, has a significant disadvantage.

In modern naval warfare it is important that the presence and/or location of mines should not be readily detectable. In particular, modern sonar devices are able to detect a foreign object on the sea bed with considerable success. Any discontinuity or projection on the surface of an object renders its detection by sonar very much more likely, and the nature of such an object can frequently be determined by its sonar pattern. The flanges on the modules of the prior art device thus make for its easy detection and identification by sonar. An object can be rendered virtually undetectable by sonar by coating its surface with an anechoic material, but this method is highly inconvenient especially in the case of a modular design, which would need to be coated after assembly of the modules. The only real alternative is to avoid all external projections and discontinuities which might facilitate detection, but prior to the present invention it has not been found possible to provide a modular design which meets the criterion whilst nevertheless achieving an adequalty strong joint between individual modules.

The present invention seeks to provide a modular ground mine in which all of the difficulties noted hereinbefore are overcome.

Accordingly the present invention provides a naval ground mine comprising at least two modules, each module including a cylindrical casing containing a mass of explosive, each casing being provided with a spigot on an end face thereof, and each spigot being provided with a radially outwardly directed lip, the mine further comprising a ring having a radially outer surface which conforms substantially without discontinuity to the peripheral contour of the casing at least in the region of the said end face thereof, and a radially inner surface adapted to embrace and hold together the lips on the spigots of adjacent end faces of the two modules, the ring being capable of being divided circumferentially into distinct segments to permit assembly of the mine, and being provided with fastening means whereby the ring segments can be firmly held together.

Preferably the geometric shape of the lips and the geometric shape of the inner surface of the ring are such that when the segments of the ring are drawn together they urge together the lips on the respective spigots.

In one convenient arrangement, the lips and the inner surface of the ring are each provided with mating surfaces inclined at an angle to the plane transverse to the cylinder axis, so that a pair of adjacent lips forms a wedge which enters into a tapered recess in the inner surface of the ring.

Conveniently the ring is formed in segments which can be secured together by means of circumferentially oriented screws accommodated and accessible within respective recesses in the outer surface of the ring.

The longitudinal dimension of the outer surface of the ring should be such as to maintain substantially continuous the outer surface of the mine from the casing of one module to the casing of the next.

Figure 2:
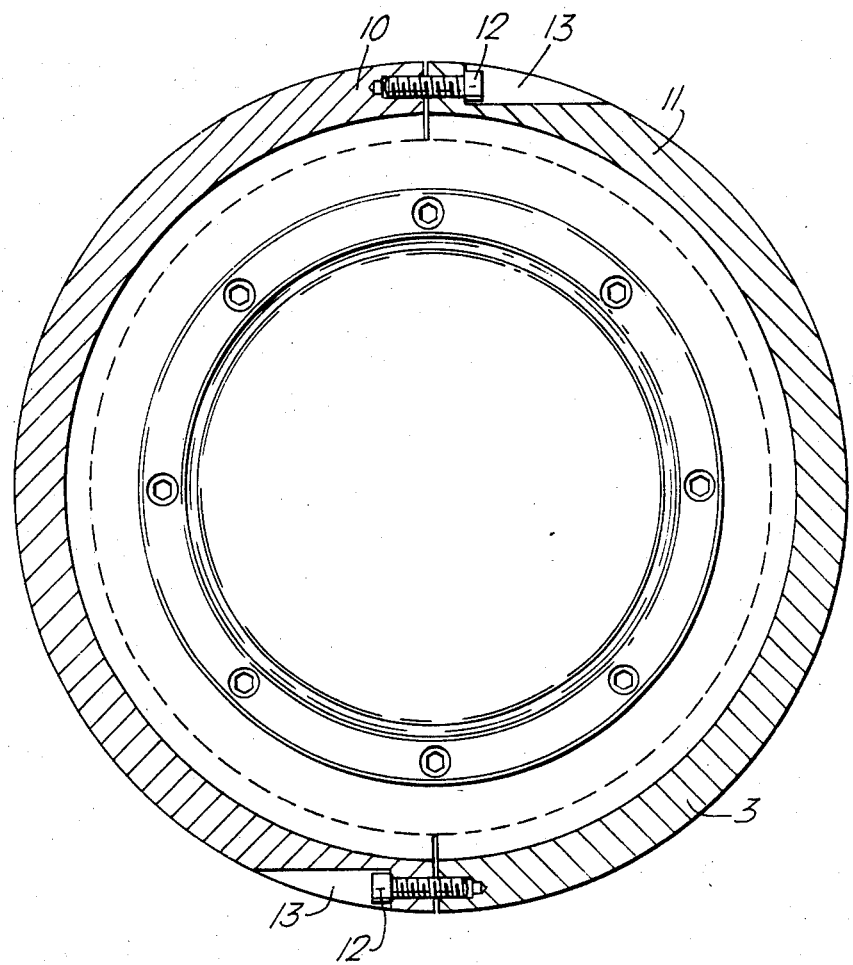

The invention will now be described by way of example only with reference to the accompanying drawings, of which FIG. 1 is a side sectional view of part of a modular mine in accordance with the invention, showing the ring assembled to hold together two adjacent modules, and FIG. 2 is a sectional view on the plane A—A of the mine shown in FIG. 1.

As shown in the Figures, a modular naval ground mine comprises two modules 1, 2 held firmly together by a ring 3, as described in detail hereinafter.

Each module comprises a cylindrical casing 4 of aluminium or other suitable metal, having a pair of similar end faces 5. Each end face 5 is provided with a spigot 6 having an annular, radially outwardly directed lip 7. As assembled, the end surfaces of the adjacent spigots 6 are in close contact.

The lips 7 are each provided with an inboard surface 8 inclined to the plane transverse to the cylinder axis, so that an adjacent pair of lips forms an outwardly tapering wedge.

The ring 3 has a radially inner surface 9 in the form of a tapered recess, the surface 9 embracing the wedge. The ring is formed in two segments 10, 11 which are releasably held together by means of machine screws 12 which are received within recesses 13 within the circumference of the ring. When the ring is assembled around the lips 7 of adjacent spigots, and the screws 12 are tightened, the tapered recess 9 conforms tightly against the wedge formed by the surfaces 8, so that the two modules 1 and 2 are thus drawn tightly together, and an extremely strong and robust joint is formed between them.

The ring 3 is so designed that when the two segments 10, 11 are thus drawn tightly together, the outer surface of the ring conforms closely to the external periphery of the casings 4 so that there is substantially no surface discontinuity at the joint, other than the very small recesses 13 necessary for access to the screws 12.

In the end faces 5, the casing is formed with deep ribs 15 for strength, separated by thin face sections 16 through which, when the mine is detonated, the explosive train can take over from one module to the next.

The exterior form of the faces 5 is recessed. In the mating faces, there is provided a locating ring 17, held in place by screws 18, for assisting in proper alignment of the modules 1, 2. The corresponding recess in the opposite ends of the modules is used at one end to locate a deformable nose piece (not shown), and at the other end to locate a safety and arming unit shown schematically at 19.

It is contemplated that modular mines according to the invention would be made up from two modules of the kind described, for example of 100 Kg and 300 Kg explosive mass respectively. This would enable mines to be constructed of 100, 200, 300, 400 or 600 Kg mass by use of not more than two modules in any case.

Alternatively, a system based on a single module of say 200 Kg mass might be found more convenient in practice.

Various alternative possibilities within the scope of the invention will be apparent to those skilled in the art.

I claim:

1. A naval ground mine comprising at least two modules, each module including a cylindrical casing containing a mass of explosive, each casing being provided with a spigot on an end face thereof, and each spigot being provided with a radially outwardly directed lip, the mine further comprising a ring having a radially outer surface which conforms substantially without discontinuity to the peripheral contour of the casing at least in the region of the said end face thereof, and a radially inner surface adapted to embrace and hold together the lips on the spigots of adjacent end faces of the two modules, the ring being capable of being divided circumferentially into distinct segments to permit assembly of the mine, and being provided with fastening means whereby the ring segments can be firmly held together.

2. A naval ground mine according to claim 1 wherein the geometric shape of the lips and the geometric shape of the inner surface of the ring are such that when the segments of the ring are drawn together they urge together the lips on the respective spigots.

3. A naval ground mine according to claim 2 wherein the lips and the inner surface of the ring are each provided with mating surfaces inclined at an angle to the plane transverse to the cylinder axis, so that a pair of adjacent lips forms a wedge which enters into a tapered recess in the inner surface of the ring.

4. A naval ground mine according to claim 3 wherein the ring is formed in segments which can be secured together by means of circumferentially oriented screws accommodated and accessible within respective recesses in the outer surface of the ring.

* * * * *